United States Patent
Chen et al.

(10) Patent No.: US 10,913,443 B2
(45) Date of Patent: Feb. 9, 2021

(54) POWERTRAIN CONTROL BASED ON AUXILIARY BATTERY CHARACTERISTICS

(71) Applicant: Ford Global Technologies, LLC, Dearborn, MI (US)

(72) Inventors: Hanyang B. Chen, Canton, MI (US); Karen Price, Pinckney, MI (US); Michael J. Irby, Monroe, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 450 days.

(21) Appl. No.: 15/601,132

(22) Filed: May 22, 2017

(65) Prior Publication Data
US 2018/0334158 A1    Nov. 22, 2018

(51) Int. Cl.
*B60W 20/13*    (2016.01)
*B60W 10/06*    (2006.01)
*B60W 10/30*    (2006.01)

(52) U.S. Cl.
CPC ............ *B60W 20/13* (2016.01); *B60W 10/06* (2013.01); *B60W 10/30* (2013.01); *B60W 2510/06* (2013.01); *B60W 2510/244* (2013.01); *B60W 2510/30* (2013.01); *B60W 2710/06* (2013.01); *B60W 2710/244* (2013.01); *B60W 2710/30* (2013.01); *B60Y 2200/91* (2013.01); *B60Y 2200/92* (2013.01); *Y10S 903/93* (2013.01)

(58) Field of Classification Search
CPC ....... B60W 20/13; B60W 10/06; B60W 10/30
See application file for complete search history.

(56) References Cited

U.S. PATENT DOCUMENTS

| | | | | |
|---|---|---|---|---|
| 5,150,034 A | * | 9/1992 | Kyoukane | B60K 6/46 180/65.245 |
| 6,526,931 B1 | * | 3/2003 | Vilou | F02N 11/0825 123/179.4 |
| 6,532,926 B1 | * | 3/2003 | Kuroda | B60H 1/00778 123/179.4 |
| 7,199,588 B2 | | 4/2007 | Blessing et al. | |
| 7,347,175 B2 | * | 3/2008 | Lupo | F02N 11/0818 123/179.4 |
| 7,890,243 B2 | * | 2/2011 | Abendroth | F02N 11/0818 123/179.3 |
| 7,928,735 B2 | * | 4/2011 | Huang | G01R 31/389 324/426 |
| 9,181,895 B2 | * | 11/2015 | Roberts | F16H 61/0031 |
| 9,821,793 B2 | * | 11/2017 | Lian | B60W 20/13 |
| 10,040,455 B2 | * | 8/2018 | Khafagy | B60K 28/04 |
| 10,400,733 B2 | * | 9/2019 | Chen | F02N 11/0825 |
| 2014/0081561 A1 | * | 3/2014 | Be | B60W 50/085 701/112 |
| 2015/0154816 A1 | | 6/2015 | Chen et al. | |
| 2016/0311369 A1 | | 10/2016 | Tabatowski-Bush et al. | |
| 2017/0089314 A1 | * | 3/2017 | Books | B60W 20/13 |
| 2018/0093669 A1 | * | 4/2018 | Khafagy | B60W 30/18054 |

* cited by examiner

*Primary Examiner* — Ramsey Refai
(74) *Attorney, Agent, or Firm* — Dave Kelly; Brooks Kushman PC

(57) ABSTRACT

A powertrain control system may include an engine and a controller. The controller may be configured to, responsive to a maximum difference in battery voltage values remaining less than a threshold value during a period in which a number of engine stop-start cycles exceeds a limit, enable an automatic stop-start system of the engine.

15 Claims, 4 Drawing Sheets

POWERTRAIN CONTROL BASED ON AUXILIARY BATTERY CHARACTERISTICS

TECHNICAL FIELD

This application is generally related to a control system for a vehicle that is configured to disable engine start-stop or smart-regeneration-charging based on battery characteristics.

BACKGROUND

Many vehicles include a combustion engine, a battery (e.g., a 12-voltage lead-acid battery), a starter, an alternator, and vehicle electric loads. Typically, the battery is charged by the alternator when the engine is operating, and discharged when the engine is not running. Recently Smart-Regeneration-Charging (SRC) and auto Start-Stop (SS) functions have been added to conventional vehicles for vehicle fuel-economy improvement and emission reduction.

SUMMARY

A powertrain control system may include an engine and a controller. The controller may be configured to, responsive to a maximum difference in battery voltage values remaining less than a threshold value during a period in which a number of engine stop-start cycles exceeds a limit, enable an automatic stop-start system of the engine.

A vehicle powertrain method performed by a controller includes, responsive to a voltage change of a battery exceeding a threshold while a current change of the battery is below a low current threshold, disabling automatic stop-start of an engine, and responsive to the voltage change exceeding the threshold while the battery current is above the low current threshold for a number of engine start cycles that exceeds a limit, enabling the automatic stop-start.

A powertrain control system may include an engine and a controller. The controller may be configured to, responsive to a maximum difference in battery voltage values remaining less than a threshold value during a period and an average battery voltage within the period being less than an operating threshold in which a number of engine stop-start cycles exceeds a limit, enable an automatic stop-start system of the engine.

DETAILED DESCRIPTION

Figure 1:
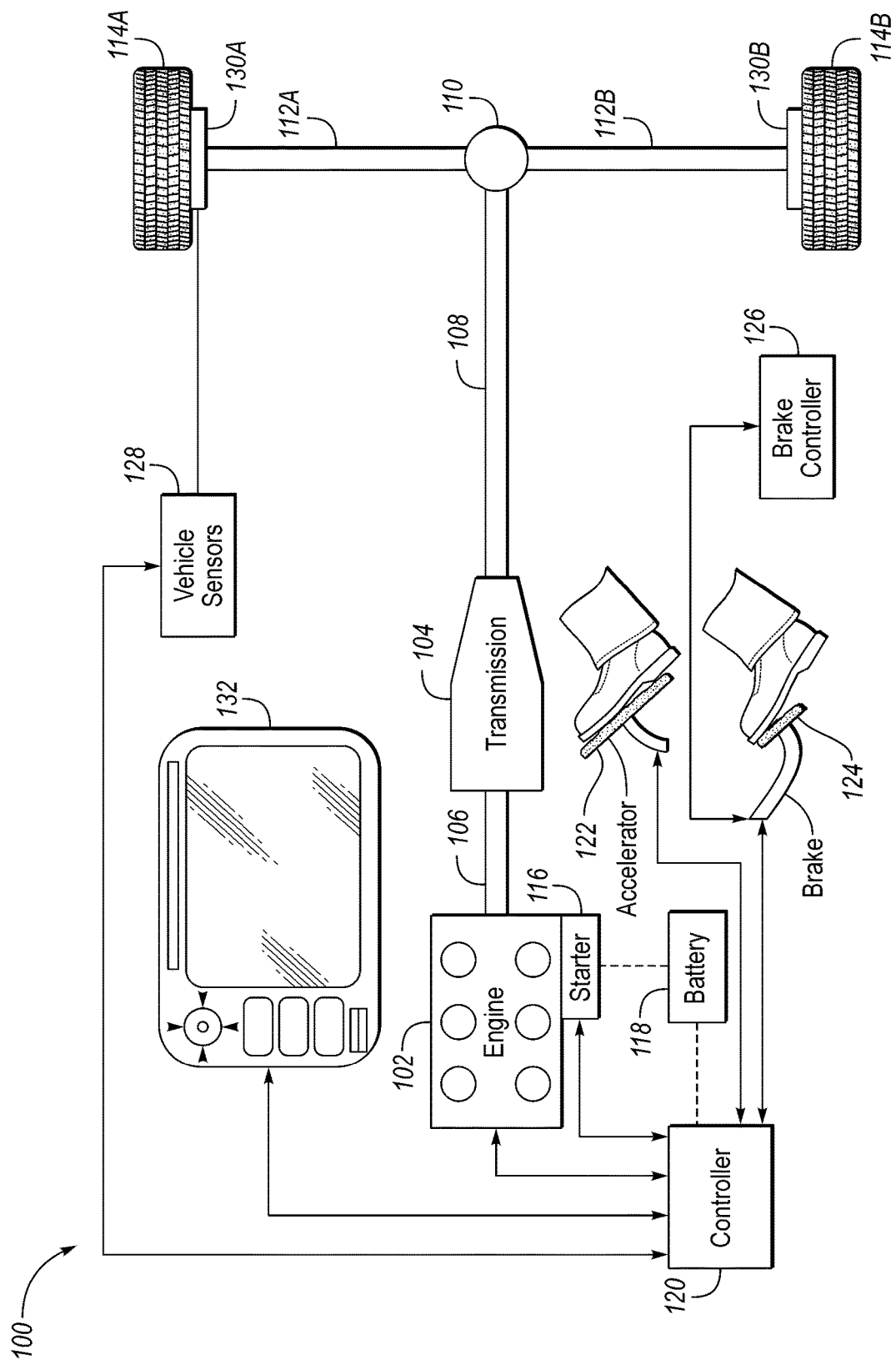
FIG. 1 is a schematic diagram of a vehicle having a start-stop control system.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Vehicles traditionally include a lead-acid battery used to power accessories and a starter motor for an internal combustion engine. As the battery ages, a connection between a battery cell and the vehicle's electric system may become disconnected due to corrosion of a battery post, a battery terminal, or an interface therebetween. Also, after the engine has been started, the battery post or battery terminal may become disconnected due to vehicle vibrations. Here, the battery post is a connection port for the battery that brings current and voltage of internal battery cells to the vehicle, while the battery terminal is a connector that is configured to couple with the battery post to connect the battery cells to vehicle electrical systems. When an engine is running, a disconnection or compromised connection of the battery terminal from the battery post may cause the engine to stall, or may increase a stall speed below which the engine will stall. Often, when the battery is disconnected after the engine is running, the engine and vehicle may continue to operate when an alternator of the vehicle produces more power than the vehicle needs to operate. Consequently, the engine may stall when the alternator produces less power than the engine requires to run. Also, if the engine is shut-off after the battery cells are disconnected from the vehicle electric system, the vehicle will not be able to restart and thus leave the vehicle stranded. This is especially a concern when the vehicle is operating in a Smart-Regeneration-Charging (SRC) of a hybrid vehicle and/or engine auto Stop-Start (SS) mode of a hybrid or conventional internal combustion engine powered vehicle.

When a vehicle is accelerating, the engine efficiency is low. The SRC function utilizes this and turns off the alternator during acceleration to save fuel and reduce emissions. Thus, during SRC, all vehicle loads including the vehicle ignition are (at times) powered by the battery only. And the battery is charged by the alternator when energy is available (e.g., when the brake pedal is pressed, foot is removed from an accelerator pedal, coasting downhill, etc.). The SS function is control of the engine in which the engine is stopped to save fuel and reduce emissions when the vehicle is stopped by the brake pedal. When in SS mode, the ignition is on and the engine is stopped, the engine will be automatically started when the brake pedal is released and the accelerator is depressed.

During both SRC and SS operation, the alternator may be turned off such that vehicle electric loads are supported by the battery. Therefore, it is critical that battery power is maintained during SRC and SS operation.

One possible battery failure mode that results in a disconnection of battery power is a disconnection between a battery pole (i.e. battery terminal) and the battery cable that is connected to vehicle electric loads. Another is corrosion of the connection between a battery pole and the battery cable. In addition, the battery cable may be improperly connected to the battery pole. Further, the connection between the battery pole and the battery cable may be compromised due to vehicle vibration. In any of these or other conditions that result in a faulty, compromised, disconnected, or highly resistive connection, an engine stall may occur after which engine auto start may not be possible after the engine stops.

Here, a battery fault detection algorithm is disclosed that detects a failure of a battery pole connection. Due to the electrical connection between the battery pole and battery cable, the battery current will typically change when the battery voltage changes. When the battery pole and cable are disconnected or the connection is highly resistive, the battery current will remain zero or approximately zero and may not change when the battery voltage changes. Therefore, failure of the battery pole connection may be detected if the battery current is always substantially zero at different battery voltages. When a battery pole connection failure is detected, vehicle SRC, auto Start-Stop, and other critical vehicle operations may be disabled by a Battery-Management-System (BMS) so that the vehicle alternator is always on. A corresponding DTC and warning may be generated.

As discussed above, a battery pole connection to the battery cable may be compromised due to corrosion of the battery pole or due to vehicle vibrations. These conditions may result in a fluctuation in an electric resistance between the battery pole and the battery cable. A battery resistance may be monitored by a battery sensor. For example, the battery sensor may be within a battery module that is coupled with battery terminals and used to measure a battery current, voltage, and temperature that then may be used to estimate the battery resistance. This electric resistance may include a battery internal resistance and a resistance between the battery pole and battery cable. When the connection is compromised, the monitored battery resistance may fluctuate. A controller may monitor and detect the fluctuations, and when the fluctuations exceed a threshold, the controller may disable SRC and SS and generate a corresponding DTC and warning.

Most Hybrid Electric Vehicles (HEVs) have an auxiliary battery (e.g., a 12-volt battery) to provide electric power for vehicle lighting, control modules, climate blowers, electric power assisted steering (EPAS), and other low-voltage electric loads in vehicle. A DC/DC converter is typically used in HEVs to charge the 12-volt battery. The battery connection algorithms and systems disclosed in this application are also applicable in HEVs and other electrified vehicles. For example, when a compromised battery connection is detected in a HEV, the DC/DC may be configured such that electric power is selectively available for vehicle operation. Critical vehicle operations (e.g., cruise control, EPAS) may be disabled while corresponding DTCs and warnings may be set. Further, this algorithm and system may also be used in autonomous vehicles (AV). When a disconnection or loose battery pole connection is detected, critical operation may be disabled in during autonomous operation along with setting a DTC, and warning to the driver to disable vehicle auto operation.

In addition to lead acid batteries, other battery chemistries are being adopted such as Lithium-ion battery. Use of a Lithium-ion battery as a replacement of lead-acid battery reduces weight and increases performance. However, with Lithium-ion batteries, there may be a self-protection relay coupled between the battery post and the battery cells. In extreme conditions (e.g., very high or low voltages, very high or low temperatures) a battery module controller may open the battery cell protection relay, and thereby disconnecting the battery post. Here, a system detects a battery post disconnection and adjusts corresponding vehicle warning and powertrain control. The vehicle may be a conventional internal combustion engine, or a hybrid electric vehicle.

Here, a controller will set a flag (e.g., BattPoleFailureFlag=TRUE) in a module (e.g., a body control module 'BCM', or a powertrain control module 'PCM') when a disconnection of a battery post is detected. The detection may be based on a value and/or a variation of a battery current and/or a battery voltage. Battery disconnection may be immediately detected in a conventional vehicle with an internal combustion engine when either battery post (i.e., negative or positive post) is disconnected and the engine is running. However, in an EV/FHEV/PHEV/or Autonomous Vehicle (e.g., having a 12-volt battery charged by a DC/DC converter), the battery disconnection may be detected immediately after there is a change in a vehicle electric load (e.g., turning on/off lights, opening a door, or turning on/off radio, etc.).

Similarly, the flag (e.g., BattPoleFailureFlag) is set when a disconnect of the battery post is detected based on a value and/or a variation of a battery resistance measured by a vehicle battery monitoring system (BMS). The BMS may include a module coupled with a post of the battery and configured to measure characteristics of the battery such as voltage, current and resistance. The determination based on resistance may be used to supplement the determination using current and voltage as described above. In this application, the term battery fault is used to describe a condition in which there is a battery connection fault.

Once a disconnect is determined, the powertrain controller may limit functions, for example, the powertrain controller may disable Smart-Regeneration-Charge (SRC) and Auto Stop-Start (SS) modes of operation based on the flag. (e.g., BattPoleFailureFlag=TRUE). Smart-Regeneration-Charging (SRC) is when the battery is charged with a high alternator voltage when vehicle is in a low load condition (e.g., vehicle deceleration, vehicle stopped). In some instances, the alternator provides a braking function during vehicle deceleration while electric power from the alternator is generated by converting the vehicle deceleration into energy. Conversely, during vehicle high load conditions (e.g., acceleration or the engine operating in a low-efficient mode), the alternator may be turned off such that electric power is not generated or reduced for a reduction of fuel consumption. When the vehicle is traveling at a constant speed, the alternator may be controlled to charge the battery based on battery SOC (State-Of-Charge).

Next, a battery warning may occur to notify a driver of the vehicle. The battery warning may include illumination of a symbol on a vehicle's cluster or an audible alert output via a speaker, piezo-electric element, or may be transmitted via an infotainment system. This may be followed by setting a diagnostic trouble code (DTC).

To turn off the battery warning, clear DTC, and remove the inhibit of SRC and SS features, first the flag must be cleared (BattPoleFailureFlag=FALSE) based on the conditions (e.g., voltage, current or resistance values and variations) and a number of (e.g., 3, 5, or 10) successful engine cranks (for a conventional or hybrid vehicle with an internal combustion engine) or a number of (e.g., 3, 5, or 10) vehicle sleep/awake cycles (for an EV/FHEV/PHEV/or Autonomous vehicle having an auxiliary battery charged by a DC/DC converter). These steps are also applicable to vehicles with different battery voltages and chemistries (e.g., 12-volt, 24-volt, 48-volt, Low-Voltage-Power-Net (LVPN) with dual-battery, Lithium-ion battery systems, Lead-acid battery systems, and other high voltage batteries).

A traditional start-stop system may be configured to auto-stop the engine when the vehicle is not in motion (e.g., 0 mph), a force is applied to the brake pedal, and the voltage level for the vehicle battery is above a threshold. The threshold is selected based on the energy require to start the engine via an electric starter. Once the engine is stopped, the controller may automatically start the engine if the gear selector is in drive and there is an absence of force applied to the brake pedal. In other embodiments of a start-stop vehicle, the controller may be configured to auto-stop the engine when the vehicle is in motion at a speed below a low speed threshold (e.g., 2 mph or 4 mph), a force is applied to the brake pedal, and the voltage level for the vehicle battery is above a threshold. When the vehicle is in motion, the threshold is a higher threshold as the vehicle still requires some power to activate electric power brakes and EPS. Along with the traditional start-stop control system, a vehicle may be configured to start-stop the engine when the vehicle is in motion above a lower threshold. This system is also referred to as a rolling start-stop system (RSS).

A RSS may have additional benefits such as an improved fuel economy rating, improved vehicle emissions, and reducing engine noise. These benefits may be in addition to the improvements from a conventional start-stop system. An RSS allows the engine to auto-stop at a higher vehicle speed once a driver applies the brakes and the vehicle speed is less than an upper vehicle speed threshold. For example, the use of an RSS may increase the fuel economy by ≈2.4% and reduce the carbon emission by ≈9 CO2 g/mi. In order for RSS to combine the above benefits of increased fuel economy and reduced carbon emissions without impacting drivability and the noise associated therewith, a reliable and stable power supply is required to operate critical and safety components while the engine is Auto-Stopped.

Producing energy by the engine only when needed/required is one of the main approaches to maximizing fuel economy while minimizing emissions in vehicles equipped with internal combustion engines. Accordingly, SS/RSS systems are being considered for implementation across a range of modern vehicles for all of the world's key markets. A SS/RSS system may include a battery system that may be implemented a single battery, dual batteries, any number of batteries. The battery system may have an operating voltage approximately equal to a standard vehicle battery (i.e., 12 Volts) or may operate at other voltages (e.g., 24V, 48V, etc.) SS/RSS systems may utilize any combination of same or different technologies of batteries or power sources such as Lead Acid, Enhanced Flooded (EFB), Absorbent Glass Mat (AGM), LI-Ion or any other battery technology.

Referring to FIG. 1, a micro-hybrid vehicle 100 (also known as a start-stop vehicle) includes an engine 102 and a transmission 104. A crankshaft of the engine 102 is drivably connected to the transmission input shaft 106 in order to transmit power from the engine to the transmission. The transmission 104 includes an output shaft 108 that is drivably connected to a differential 110. The differential 110 selectively provides power to the driven wheels 114A and 114B via one or more axles-such as half shafts 112A and 112B. In some embodiments, the differential 110 is disposed within the transmission housing. The vehicle 100 also includes an engine-starter motor 116 that is configured to rotate the crankshaft to turn-over the engine 102 in response to an engine-start signal from the controller 120. The engine-starter motor 116 may be an enhanced starter motor that is specifically designed for the increased duty cycle associated with a micro-hybrid vehicle. The starter 116 is powered by a battery 118, which may be a 12 volt battery, 24-volt battery, 48-volt battery or other low voltage battery or high-voltage battery. A low voltage battery is a battery with a DC voltage less than 100 Volts, a high voltage battery is a battery with a DC voltage equal to or greater than 100 Volts. In some embodiments, the engine may include multiple starter motors. A first starter motor may engage a ring gear of the flywheel to turn the engine over. A second motor may connect to the crankshaft pulley by belt, chain, or other means known in the art.

An accelerator pedal 122 provides operator input to control a speed of the vehicle 100. The pedal 122 may include a pedal-position sensor that provides a pedal-position signal to the controller 120, which provides control signals to the engine 102.

A brake pedal 124 provides operator input to control the brakes of the vehicle. The brake controller 126 receives operator input through a brake pedal 124, and controls a friction brake system including wheel brakes 130A and 130B, which is operable to apply a braking force to the vehicle wheels such as vehicle wheel 114A and vehicle wheel 114B. The pedal 124 may include a pedal-position sensor that provides a pedal-position signal to the controller 120. The vehicle may include an electric-parking brake that is in communication with the controller 120. The controller 120 is programmed to automatically engage the parking brake when desired.

The controller 120 may be a plurality of controllers that communicate via a serial bus (e.g., Controller Area Network (CAN), FlexRay, Ethernet, etc.) or via dedicated electrical conduits. The controller generally includes any number of microprocessors, microcontrollers, ASICs, ICs, volatile (e.g., RAM, DRAM, SRAM, etc.) and non-volatile memory (e.g., FLASH, ROM, EPROM, EEPROM, MRAM, etc.) and software code to co-act with one another to perform a series of operations. The controller may also include predetermined data, or "look up tables" that are based on calculations and test data, and are stored within the memory. The controller may communicate with other vehicle systems and controllers over one or more wired or wireless vehicle connections using common bus protocols (e.g., CAN, LIN, Ethernet, etc.). Used herein, a reference to "a controller" refers to one or more controllers.

As noted above, embodiments of the present disclosure include a control system for controlling a start-stop system for an engine in a vehicle, such as the engine 102 and the vehicle 100. Such a control system may be embodied by one or more controllers, such as the controller 120. One goal of a vehicle start-stop system is to automatically stop the engine under certain conditions, while restarting it automatically when conditions change. This provides greater fuel economy and reduced emissions.

In some start-stop systems, the engine may be automatically stopped (auto-stopped) when all of a certain set of conditions are met. For example, if the gear lever is in DRIVE, the brake pedal is pressed, the accelerator pedal is released, and the vehicle speed is zero, the engine 102 may be automatically stopped. Another condition that may be included in this set of conditions is that none of the vehicle subsystems (e.g., air conditioning or power steering) require the engine to be running. In a start-stop system where all conditions are required to be met before the engine is auto-stopped, not only will the start-stop system inhibit the engine from being automatically stopped if any of the conditions in the set are not met, but once having been auto-stopped, the engine may be automatically restarted if any of the conditions change.

Continuing then with the example from above, one of the common conditions to stopping an engine is a speed of the vehicle being zero. Often, an engine will not be stopped while the vehicle is in motion. In some systems, the vehicle motion may be greater than zero, but less than a lower speed threshold such as 3 kph or 5 kph. Here, a rolling start-stop system allows the engine 102 to be auto-stopped if the speed of the vehicle is within a speed range. The speed range includes an upper threshold speed and a lower threshold speed. The lower threshold speed may be a speed at which the vehicle may be stopped using an emergency brake such as at 0 mph, 2 mpg or 5 mph. At the lower threshold speed, the voltage level threshold of the starter battery 118 is selected to provide an amount of charge needed to operate electrical vehicle components powered by the battery 118. The upper threshold speed may be a speed, associated with a voltage of the starter battery 118 indicative of a state of charge at which the electrical vehicle components including electric power steering (EPS), electric power brakes, electric stability control (ESC), and other vehicle dynamic systems may be operated while the vehicle is in motion. Along with vehicle control systems are vehicle comfort systems such as seat heaters, an air conditioning system, and a window defroster, these systems may use considerable power and may be required to be accounted for in the battery voltage calculation.

Another vehicle characteristic to consider when calculating an engine shut off point is a capacity and pressure of a vacuum reservoir used to provide brake boost vacuum assistance. The upper threshold speed may be selected from a range of speeds such as 15 mph to 60 mph. The ability of the vehicle to steer and stop is dependent upon many conditions of the vehicle including speed, weight, angle of inclination, brake conditions, road conditions, and tire conditions. As these conditions change, the ability of the vehicle to steer and stop also changes. For example, a vehicle traveling downhill is more difficult to stop than if the vehicle was traveling uphill. Therefore, a controller 120 may be configured to set a fixed lower threshold based on a lower speed to guard against a range of the conditions that affect a vehicle's stopping. Also, the controller 120 may be configured to set a fixed upper threshold based on an upper speed to guard against a range of the conditions that affect a vehicle's stopping. Alternatively, the controller 120 may be configured to dynamically change the lower threshold and upper thresholds based on the conditions of the vehicle at a point in time.

The controller 120 may also be configured to dynamically change the lower threshold and upper thresholds based on the conditions of the vehicle at a future point in time. For example, a navigation system 132 may be coupled with the controller 120 such that a route may be provided to controller. The route may include a change in elevation along the route and adjust the upper and lower speed thresholds according to the changes in potential braking along the route. The route may also include changes in posted speeds that are indicative of locations at which brakes may be applied to reduce the speed, or an accelerator pedal may be used to increase the speed. The route may include locations at which a potential stopping point is, such as static locations and dynamic locations. A static location at which a potential stopping point is, includes a traffic light, a stop sign, a round-about, or a yield sign. A dynamic location at which a potential stopping point is along the route includes locations associated with traffic congestion, weather conditions, road construction, or accidents. The route displayed by the navigation system 132 may be generated by based on map data that has been preloaded in memory of the system 132, or the system 132 may receive data streamed from a remote server. The data may be streamed wirelessly using cellular, Wi-Fi or other standard technology. Based on the route, changes in elevation, and potential stopping points along the route the controller 120 may adjust the voltage level of the starter battery 118 to maintain a state of charge of the starter battery 118 to reserve power for electrical accessories that are powered by the battery 118 including electric power steering (EPS), electric power brakes, electric stability control (ESC), and other vehicle dynamic systems.

There are conditions in which restarting may be undesirable, for example, if the operator intends to place a vehicle in PARK, and shut the engine Off, or if the operator intends to place the vehicle in NEUTRAL and remained stopped. Therefore, in at least some embodiments of the present disclosure, the controller 120 is configured to account for these different requirements. For example, when the engine 102 has been autostopped with the vehicle in DRIVE, and the gear lever of the transmission 104 is shifted out of DRIVE, the controller 120 may be configured to automatically restart the engine 102 under at least one condition, and to inhibit automatic restarting the engine 102 under at least one other condition.

Figure 2:
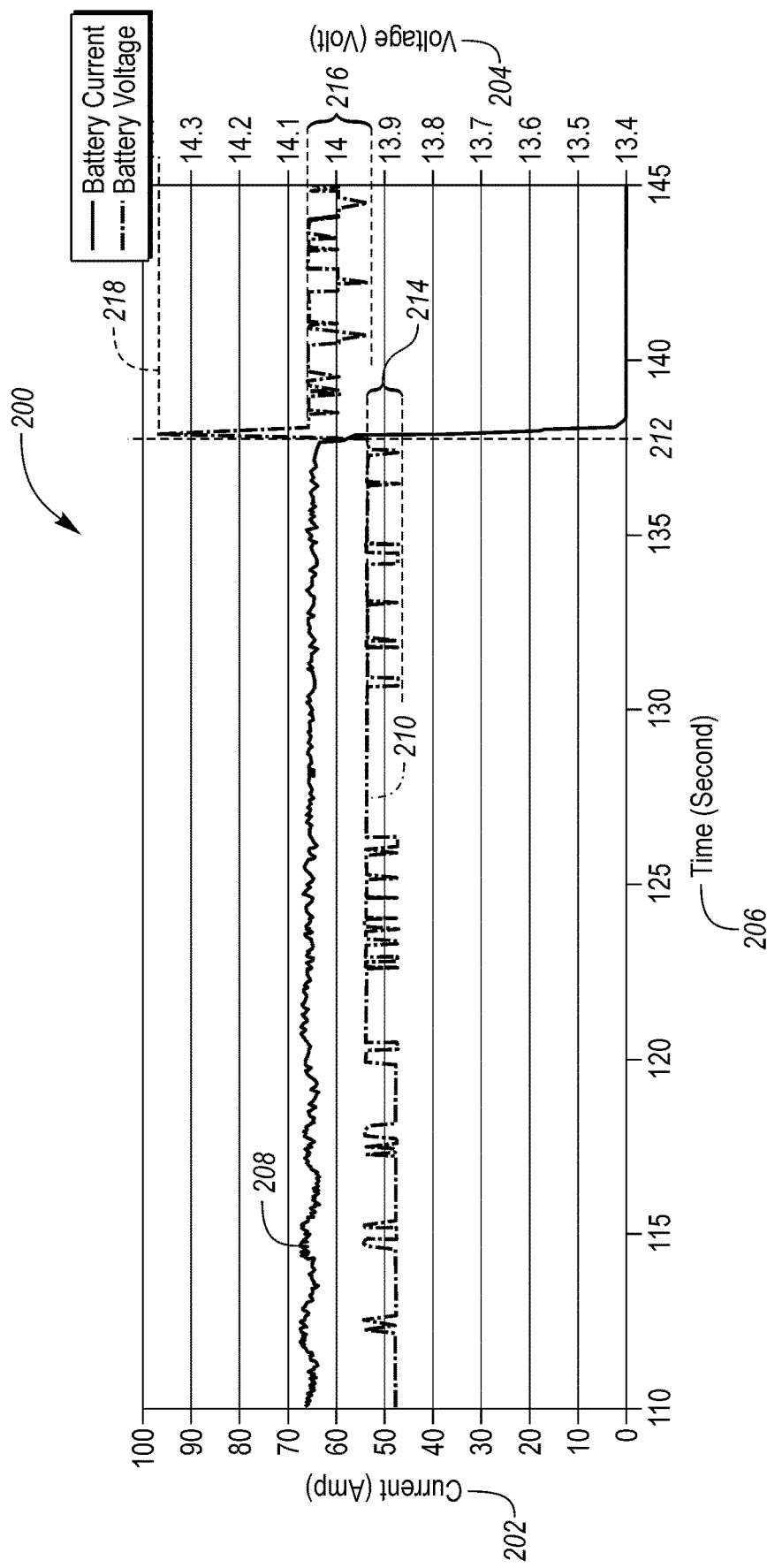
FIG. 2 is a graphical illustration of a battery voltage profile and a battery current profile with respect to time.

Control logic or functions performed by the controller 120 may be represented by flow charts or similar diagrams, such as the flow chart 200 in FIG. 2. FIG. 2 provides a representative control strategy and/or logic that may be implemented using one or more processing strategies such as polling, event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-controlled vehicle, engine, and/or powertrain controller, such as controller 120. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices that utilize electric, magnetic, and/or optical storage to keep executable instructions and associated calibration information, operating variables, and the like.

FIG. 2 is a graphical illustration 200 of battery current 202 and battery voltage 204 with respect to time 206. A battery current profile 208 and battery voltage profile 210 are shown with respect to time 206. The battery current profile 208 is fluctuating around 65 Amps during the operational window starting at time 110 seconds until a point in time 212 at which the battery post is disconnected from the battery terminal connector. At the disconnection time 212, the battery current drops to approximately 0 Amps. Also, the battery voltage profile 210 fluctuates between approximately 13.88 and 13.94 Volts during the operational window starting at time 110 seconds until a point in time 212 at which the battery post is disconnected from the battery terminal connector. Prior to the disconnection time 212, the normal operational voltage fluctuation 214 is approximately 0.06 Volts. At the disconnection time 212, the battery voltage increases to a peak 218 and then settles into a fault range that fluctuates between 13.94 and 14.06 Volts, thus after the disconnection time 212, the disconnect voltage fluctuation 216 is approximately 0.12 Volts which is approximately twice the magnitude of the normal operational fluctuation 214.

The battery disconnect time 212 includes a time at which the battery pole loosens or is disconnected thereby changing the resistance. When the engine is running and the battery is either disconnected or connected via a resistive path, the engine may still operate based on the vehicle alternator output. Often when a vehicle idles, the revolutions per minute fluctuate around a typical idle speed, however, the low speeds of some of the fluctuations may be below a alternator threshold speed needed power operation of the engine and as a result the engine stall. A system may increase an average idle speed upon detection of a battery disconnect or an increased battery resistance to reduce the risk of stalling by preventing the alternator rotational speed from falling below a battery disconnect speed threshold or by inhibiting shutting off, in a Stop-Start (SS) vehicle, the engine to maintain power flowing from the alternator.

Many vehicles have a Battery Management System (BMS) that is configured to measure a battery current and voltage. Often the battery current and voltage is measured by the BMS module or a current sensor coupled with a battery negative post or connector. The voltage and current signals from the BMS may then be used by other vehicle modules such as a body control module (BCM) and a powertrain control module (PCM). The measurement of both the battery current and voltage are still measured when battery pole is disconnected or loosed. When battery pole is disconnected, the measured current is zero and the measured voltage is across a battery positive and negative terminals or connectors.

In one example, a vehicle, such as a hybrid vehicle or a conventional vehicle, with a Smart-Regeneration-Charge (SRC) or Stop-Start (SS) mode enabled. When the SRC is enabled and during specific vehicle operation event a controller may adjust (e.g., reduce) a target alternator voltage to increase vehicle fuel economy. The specific vehicle operation event may include a vehicle acceleration request exceeding a threshold or a vehicle deceleration request dropping below a threshold (e.g., a driver quickly changing a force applied to an accelerator pedal). The specific vehicle operation event may also include vehicle operation, such as a vehicle stopping and thereby the engine dropping to a low idle, or during a shift of a transmission in which the engine RPMs are decreased due to an engagement of a clutch such that the wheel speed and selected transmission gear ratio that thereby reduces the engine speed coupled with the wheels and transmission. The alternator may be disabled when the target alternator voltage is set to a low voltage set point. Further, if the vehicle imitates auto-stop while a battery connection issue has occurred, the vehicle may not be able to auto-start the engine thereafter.

Another example is a vehicle, such as a hybrid vehicle or a conventional vehicle, with a Smart-Regeneration-Charge (SRC) or Stop-Start (SS) mode disabled. In this example, the battery is a capacitor in the charging system in addition to being an electric power source. Therefore the vehicle voltage is an output of alternator and the vehicle voltage is filtered and stabilized using the battery as a large electric capacitor. When the battery is disconnected, the vehicle voltage may have large oscillations due to characteristics of alternator voltage regulation and vehicle dynamics of electric loads. The large oscillations may result in voltages decreasing below a low voltage threshold after which an engine stall may occur.

Another example is a vehicle, such as a hybrid vehicle or a conventional vehicle, with a self-protected battery module. For example, a 12-Volt Lithium-ion battery module may include a self-protection relay. When the battery voltage is higher or lower than an upper or lower threshold, respectively, or if a battery temperature is higher or lower than a corresponding upper or lower temperature threshold, the relay will be automatically opened, by a controller, and the battery post will be disconnected from the battery cells inside the battery.

Figure 3:
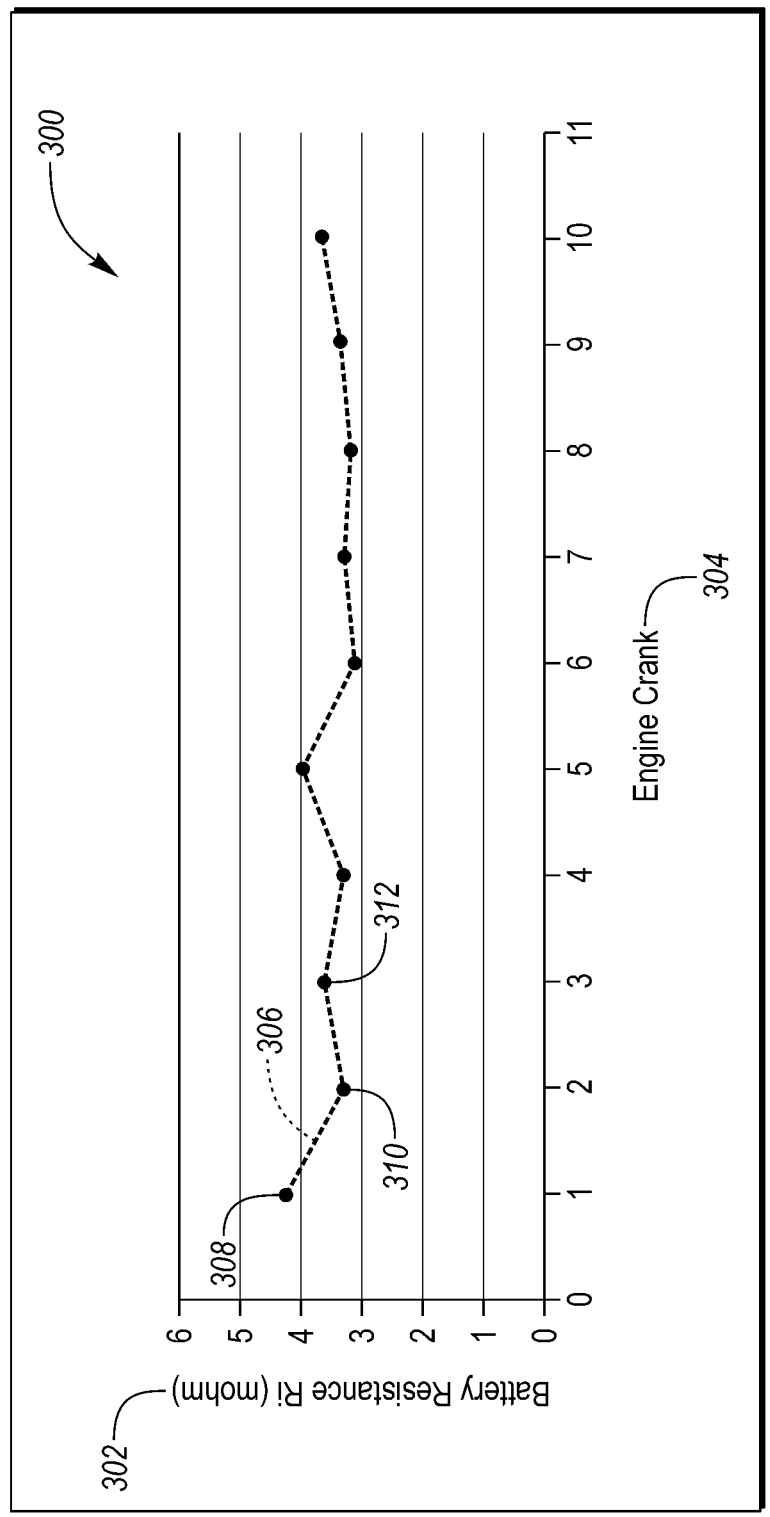
FIG. 3 is a graphical illustration of a battery resistance profile with respect to engine crank cycles.

FIG. 3 is a graphical illustration 300 of battery resistance 302 with respect to engine crank cycles 304. A battery resistance profile 306 based on voltage and current measurements during operation, including engine crank cycles. Here, a first battery resistance 308 associated with a first engine crank cycle is based on a battery current and a battery voltage. A second battery resistance 310 is associated with a second engine crank cycle that is based on the battery current and battery voltage. And a third battery resistance 312 is associated with a third engine crank cycle that is based on the battery current and battery voltage. The battery resistance points (308, 310, 312) may be plotted and a connected to form a battery resistance profile 306. Based on a value of the battery resistance profile 306, a controller may output a warning to the vehicle operator if the resistance exceeds a first threshold, and the controller may alter a powertrain operating mode if the battery resistance profile 306 exceeds a second threshold that is greater than the first threshold. Often a battery post and corresponding battery terminal connector is loose for a period of time before the connection is disconnected. Therefore, detection of a loose battery post is important to assure operation of the vehicle. Typically, a BMS module measures the battery resistance during every crank and during operation. The battery resistance is the sum of the battery internal resistance and the post resistance that is the resistance between battery post and battery terminal connector. The battery post resistance is typically close to zero when the battery post and battery terminal connector are properly connected. For example, during similar battery operating conditions (e.g., similar battery SOC and temperature) and when the battery post is properly connected to a battery terminal connector, the value of Ri is stable for different engine cranks and its variation is less than 5%. But variation of Ri is large when the battery pole is loosed. FIG. 5 depicts variation of Ri measured by BMS module when the battery pole is loosed in a test vehicle.

Here, a fault may be detected and cleared based on a value and change in value of the battery resistance. For example, if a variation of the battery resistance value is larger than a threshold (e.g., a variation of greater than 20%, or changed in resistance of over 2 mOhm) in three consecutive engine crank cycles, a battery fault may be determined and vehicle operation may be adjusted accordingly. The vehicle operation may include SRC, SS, or idle speed. And the fault may be cleared when the variation of measured resistance is less than 5% or 0.5 mOhm in three consecutive engine cranks.

Figure 4:
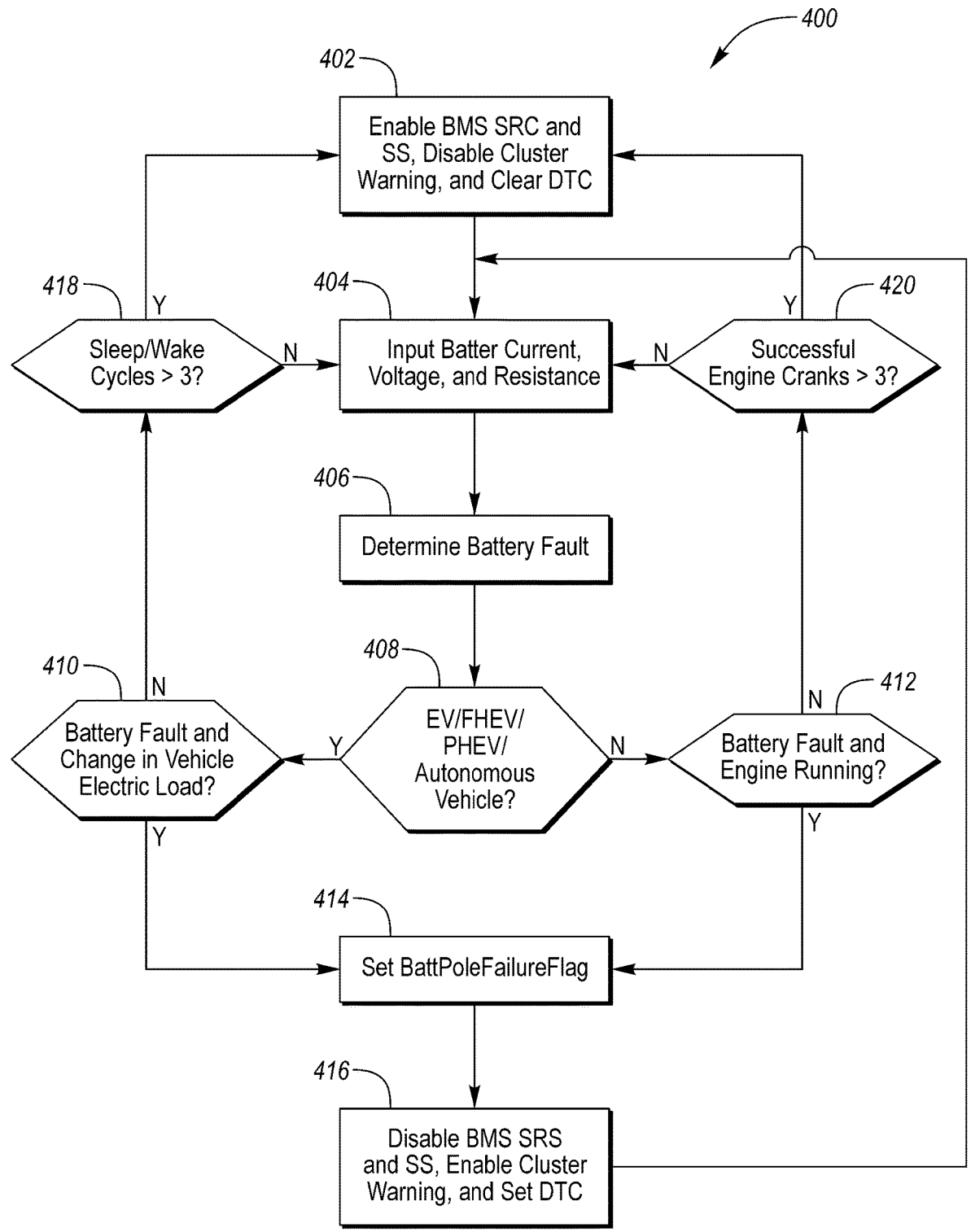
FIG. 4 is a flow diagram for a powertrain control system.

FIG. 4 is a flow diagram 400 for a powertrain control system. This flow diagram 400 depicts an algorithm that may be used to operate a vehicle having an auxiliary battery. When the battery post is disconnected while engine running (or with a DC/DC converter operating), vehicle operation may be supported by a vehicle's alternator or the DC/DC converter while a battery current is approximately zero. When the battery post is disconnected, (1) a battery current measured by a battery current sensor is less than a max tolerance of battery current sensor, (2) a change in battery current between different sampling times is approximately 0, and (3) an absolute value of a change in battery voltage between different sampling times is greater than a change threshold of voltage. Note that in equations (2) and (3), the battery current does not change when the battery voltage changes by more than a voltage threshold (e.g., a calibratable value such as 0.1 Volt).

Both vehicle and lab data showed that a battery current changed when voltage change is larger than a change in voltage even when battery is fully charged or battery is with very low temperature. For example, a controller may detect the condition based upon a detectable current change being less than a threshold corresponding to a change in voltage (e.g., less than 0.01 amperes with a corresponding change in voltage of 0.1V or less). In practice, a current change of approximately 0.0625 mAmp with a corresponding change in voltage is 0.1V has been seen.

When a vehicle first is powered up and the battery operation is normal (based on factors including battery voltage, fluctuations in battery voltage, battery current, and battery resistance), at operation 402, a controller enables SRC and/or SS (if equipped), clears a diagnostic trouble code (DTC) associated with a battery fault, and signals to turn off a warning indicator (e.g., an audible indicator or a visual indicator such as a cluster warning light). The controller will then proceed to operation 404. In operation 404, the controller receives (or in some embodiments measures) battery characteristics including a battery current, a battery voltage, and a battery resistance. The data or battery characteristics may be indicative of both the battery characteristics at a point in time and within a period of time. The controller will then proceed to operation 406.

In operation 406, the controller will evaluate the data to determine if the battery is in a fault condition. Afterwards, the controller will proceed to operation 408. A fault condition may be determined based on the battery characteristics and changes in battery conditions.

For example, a fault condition may be based on an average voltage level when the vehicle is operated in a specific mode (e.g., engine running, shifter in park, limited electrical loads enabled). As illustrated in FIG. 2, a battery voltage (non-fault) is clipped at 13.92 V when the battery is connected and then increases to a clipped battery voltage (fault) of 14.08 V which is an increase of 0.10V from the connected (non-fault) voltage. In another example, the fault condition may be based on a maximum change in voltage level over a time period. As illustrated in FIG. 2, a change in battery voltage (non-fault) is 0.06 V and then increases to a change in battery voltage (fault) of 0.12 V which is a two times increase in the change in voltage from the connected (non-fault) voltage. Another example is when the fault condition is based on a level of a current flow associated with the battery. As illustrated in FIG. 2, a battery current (non-fault) measured while the vehicle is operating is shown to be approximately 65 Amps which then decreases to approximately 0 Amps after the battery post is disconnected (fault). Based on one of these fault condition occurring, the controller will branch to operation 408.

In operation 408, the controller will branch based on a type of vehicle. The type of vehicle may differentiate an electrified vehicle, such as one that can be propelled by electric energy (e.g., in this illustrative example a classification of an electric vehicle (EV), a hybrid electric vehicle (FHEV), a plug-in hybrid electric vehicle (PHEV), or an autonomous vehicle). Generally, an electric vehicle (EV) is a vehicle that is able to move the vehicle when in gear from a complete stop to a minimum speed (e.g., 25 mph) and for a predetermined distance. Often EVs are sub divided into more specific classifications, for example, a battery electric vehicle (BEV) only uses electric power from the battery, therefore, when the battery is empty, the vehicle stops. An electric range extended vehicle (EREV) is an electric vehicle that can continue traveling after the battery is depleted via an auxiliary internal combustion engine (ICE). A fuel cell electric vehicle (FCEV) also referred to as a Hydrogen vehicle, uses a fuel cell to produce electricity and propulsion. A hybrid electric vehicle (HEV) includes an ICE that gets an occasional acceleration assist from a traction electric battery. A plug-in hybrid electric vehicle (PHEV) is an HEV with the ability to plug-in to recharge the traction battery with electricity from the power grid. However, a light hybrid electric vehicle (LHEV) which uses a minimum of electric power, and includes systems such as "Start-Stop Systems" or "Electric Assist Systems" to reduce gas consumption, (e.g. mainly stop the ICE when at idle or the vehicle is stopped as in a stoplight or in very slow traffic) may be categorized with conventional ICE vehicle. An LHEV typically does not have enough electrical power to move the vehicle in gear at the minimum speed, but still may assist the ICE at higher speeds and higher power demands. Also, an autonomous vehicle may be separately classified as they are often configured with automatic stop-start (SS) systems. Here, if the vehicle is an EV, FHEV, PHEV, or Autonomous vehicle, the controller will branch to operation 410 and of the vehicle is not an EV, FHEV, PHEV, or Autonomous vehicle, the controller will branch to operation 412.

In operation 410, the controller will branch based on a change in an electric load of the vehicle and a condition of the battery being in a battery fault. In an EV, FHEV, PHEV, or Autonomous Vehicle, an auxiliary, low-voltage, or 12-voltage battery may be charged by a DC/DC converter coupled with a high-voltage system including a high-voltage or traction battery. In this configuration, a disconnection of the auxiliary battery may be detected after there is a change of vehicle electric load (e.g., turning on/off lights, opening a door or hatch, turning on/off radio or infotainment system). If there is a change in vehicle electric load, the controller will branch to operation 414. If there is not a change in vehicle electric load, the controller will branch to operation 418.

In operation 412, the controller will branch based on a status of the engine being operating and a condition of the battery being in a battery fault. In a vehicle with combustion engine which charges the auxiliary battery from an alternator, a disconnection of the auxiliary battery may be detected when the engine is operating. If the engine is operating, the controller will branch to operation 414. If the engine is not operating, the controller will branch to operation 420.

In operation 414, the controller will set a flag indicative of a battery fault as determined in operation 406 and qualified by either operation 410 or 412. Upon setting the flag, the controller will proceed to operation 416 and the controller will disable SRC and/or SS (if equipped), set a diagnostic trouble code (DTC) associated with the battery fault, and signals to turn on a warning indicator (e.g., an audible indicator or a visual indicator such as a cluster warning light). Afterwards, the controller will proceed back to operation 404.

Also, if there is not a change in vehicle electric load or the battery is not in a fault condition, the controller will branch to operation 418. In operation 418, the controller will branch to operation 402 if the number of consecutive sleep/wake cycles exceeds a threshold. And the controller will branch to operation 404 if the number of consecutive sleep/wake cycles does not exceed the threshold. This threshold and step allows the system to verify that the connection has been restored and is not an intermittent disconnect. If the disconnection is intermittent, then the controller would not branch to 402, thereby maintaining a battery fault operational status having an increased idle and disabled SS and SRC to reduce any risk of stranding the vehicle.

Also, if the engine is not operating or the battery is not in a fault condition, the controller will branch to operation 420. In operation 420, the controller will branch to operation 402 if the number of consecutive successful engine crank cycles exceeds a threshold. And the controller will branch to operation 404 if the number of consecutive successful engine crank cycles does not exceed the threshold. This threshold and step allows the system to verify that the connection has been restored and is not an intermittent disconnect. If the disconnection is intermittent, then the controller would not branch to 402, thereby maintaining a battery fault operational status having an increased idle and disabled SS and SRC to reduce any risk of stranding the vehicle.

Control logic or functions performed by controller may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but are provided for ease of illustration and description. The control logic may be implemented primarily in software executed by a microprocessor-based vehicle, engine, and/or powertrain controller, such as controller. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as Read Only Memory (ROM) devices and information alterably stored on writeable storage media such as floppy disks, magnetic tapes, Compact Discs (CDs), Random Access Memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A powertrain control system comprising:
an engine; and
a controller configured to, responsive to a maximum difference in battery voltage values remaining less than a threshold value during a period in which a number of engine stop-start cycles exceeds a limit, enable an automatic stop-start system of the engine.

2. The powertrain control system of claim 1, wherein the controller is further configured to, responsive to a maximum difference in battery voltage values exceeding the threshold value during operation of the engine, disable the automatic stop-start system of the engine.

3. The powertrain control system of claim 2, wherein the controller is further configured to, responsive to a battery current value dropping below a low current threshold value while the engine is operating, disable the automatic stop-start system of the engine.

4. The powertrain control system of one of claim 2 or 3, wherein the controller is further configured to, responsive to disabling the automatic stop-start system of the engine, increase a low idle target speed for the engine.

5. The powertrain control system of claim 3, wherein the controller is further configured to, responsive to a maximum difference in battery voltage values remaining less than a threshold value during a time period in which a number of engine stop-start cycles exceeds a limit, and a battery current value remaining greater than the low current threshold value during the period, enable the automatic stop-start system of the engine.

6. The powertrain control system of claim 1, wherein the controller is further configured to, responsive to a maximum difference in auxiliary battery voltage values remaining less than a threshold value during a time period in which a number of engine stop-start cycles exceeds a limit, activate a smart-regeneration-charging mode.

7. The powertrain control system of claim 6, wherein the controller is further configured to, responsive to a maximum difference in battery voltage values exceeding the threshold value during operation of the engine, deactivate the smart-regeneration-charging mode.

8. The powertrain control system of claim 7, wherein the controller is further configured to, responsive to a battery current value dropping below a low current threshold value during operation of the engine, deactivate the smart-regeneration-charging mode.

9. The powertrain control system of claim 7 or 8, wherein the controller is further configured to, responsive to deactivating the smart-regeneration-charging mode, increase a low idle target speed for the engine.

10. The powertrain control system of claim 7 or 8, wherein the controller is further configured to, responsive to deactivating the smart-regeneration-charging mode, increase a target shift speed for the engine.

11. A vehicle powertrain method comprising:
by a controller,
responsive to a voltage change of a battery exceeding a threshold while a current change of the battery is below a low current threshold, disabling automatic stop-start of an engine; and
responsive to the voltage change exceeding the threshold while the battery current is above the low current threshold for a number of engine start cycles that exceeds a limit, enabling the automatic stop-start.

12. The method of claim 11 further including disabling the automatic stop-start responsive to the voltage change exceeding the threshold while the battery current is below the low current threshold.

13. A powertrain control system comprising:
an engine; and
a controller configured to, responsive to a maximum difference in battery voltage values remaining less than a threshold value during a period and an average battery voltage within the period being less than an operating threshold in which a number of engine stop-start cycles exceeds a limit, enable an automatic stop-start system of the engine.

14. The powertrain control system of claim 13, wherein the controller is further configured to, responsive to a maximum difference in battery voltage values exceeding the threshold value while the engine is operating, disable the automatic stop-start system of the engine.

15. The powertrain control system of claim 13, wherein the controller is further configured to, responsive to a battery current value dropping below a low current threshold value while the engine is operating, disable the automatic stop-start system of the engine.

* * * * *